United States Patent
Liu

(10) Patent No.: US 8,851,266 B2
(45) Date of Patent: Oct. 7, 2014

(54) MATERIAL DISTRIBUTION SYSTEM AND MATERIAL DISTRIBUTION METHOD THEREOF

(71) Applicant: Chan Li Machinery Co., Ltd., Taoyuan (TW)

(72) Inventor: Wen-Cheng Liu, Taoyuan (TW)

(73) Assignee: Chan Li Machinery Co., Ltd., Taoyuan (TW)

( * ) Notice: Subject to any disclaimer, the term of this patent is extended or adjusted under 35 U.S.C. 154(b) by 0 days.

(21) Appl. No.: 13/912,503

(22) Filed: Jun. 7, 2013

(65) Prior Publication Data

US 2014/0216895 A1    Aug. 7, 2014

(30) Foreign Application Priority Data

Feb. 6, 2013    (TW) .............................. 102104693 A

(51) Int. Cl.
*B65G 37/00*        (2006.01)
*B65G 47/64*        (2006.01)

(52) U.S. Cl.
CPC .................................... *B65G 47/648* (2013.01)
USPC ..................... 198/369.1; 198/347.4; 198/363; 198/367.1; 198/435

(58) Field of Classification Search
USPC ............. 198/347.4, 363, 367.1, 367.2, 369.1, 198/369.2, 435, 436
See application file for complete search history.

(56) References Cited

U.S. PATENT DOCUMENTS

| | | | | |
|---|---|---|---|---|
| 4,771,876 A * | 9/1988 | Bandixen | ...................... | 198/367 |
| 5,638,938 A * | 6/1997 | Lazzarotti et al. | ............ | 198/445 |
| 5,671,837 A * | 9/1997 | Tazou et al. | ................ | 198/369.2 |
| 5,692,593 A * | 12/1997 | Ueno et al. | ................. | 198/369.2 |
| 5,810,149 A * | 9/1998 | Sandberg et al. | .......... | 198/369.2 |
| 5,909,796 A * | 6/1999 | Soldavini | .................... | 198/369.2 |
| 6,000,523 A * | 12/1999 | Asai et al. | ................ | 198/377.08 |
| 6,000,531 A * | 12/1999 | Martin | .......................... | 198/835 |
| 6,484,868 B1 * | 11/2002 | Rowe | .............................. | 198/580 |
| 6,811,017 B1 * | 11/2004 | Gross et al. | ..................... | 198/453 |
| 6,851,919 B2 * | 2/2005 | Cinotti et al. | .............. | 414/794.5 |
| 7,191,893 B2 * | 3/2007 | Maldina et al. | ............ | 198/418.6 |
| 7,717,251 B2 * | 5/2010 | Glas | .............................. | 198/448 |
| 8,079,457 B2 * | 12/2011 | Heinz | ............................ | 198/435 |
| 8,490,773 B2 * | 7/2013 | Kolbe et al. | ................... | 198/355 |

* cited by examiner

*Primary Examiner* — Douglas Hess
(74) *Attorney, Agent, or Firm* — Rosenberg, Klein & Lee

(57) ABSTRACT

The present invention provides a material distribution system and method thereof, comprising first, second and third conveyors, first, second, third and fourth material distribution paths, first and second material distribution rockers, and a movable material-distributing guide plate. Material conveyed on the second conveyor is delivered to the first or second material distribution rocker by switching the movable material-distributing guide plate, material conveyed on the first or second conveyor is delivered to the first or second material distribution path by switching the first material distribution rocker, and material conveyed on the second or third conveyor is delivered to the third or fourth material distribution path by switching the second material distribution rocker. Uniform distribution or non-uniform distribution of material conveyed on three routes of conveyors to four routes of material distribution paths may be achieved by material distribution facilitated by one movable material-distributing guide plate and two material distribution rockers.

10 Claims, 4 Drawing Sheets

(A)

(B)

MATERIAL DISTRIBUTION SYSTEM AND MATERIAL DISTRIBUTION METHOD THEREOF

FIELD OF THE INVENTION

The present invention is related to a material distribution system and a material distribution method thereof, particularly to a material distribution system and a material distribution method thereof used for uniform distribution or non-uniform distribution of material conveyed on three routes of conveyors to four routes of material distribution paths.

BACKGROUND

In the production process, it is commonly required for distribution of material or products conveyed on a conveyor to several paths, so as to spread material, facilitating subsequent process or assembly.

In the past material distribution procedure of material, the way of manual handling may be adopted to transport material delivered on at least one route of conveyor to several routes of material distribution paths, respectively. For instance, material conveyed on one route of conveyor may be transported to two routes of material distribution paths, respectively, or material conveyed on three routes of conveyors may be transported to four routes of material distribution paths. In this case, it is frequently capable of uniform distribution of material conveyed on the conveyor to each route of material distribution path successfully by means of material distribution in the way of manual handling. However, time-consuming, laborious, low working efficiency and so on are presented in manual material distribution, unfavorable to manufacturing on production line.

At present, automatic material distribution procedure is generally adopted instead. Referring to FIGS. 1(A)-1(B), there are shown a structural top view and a structural side view illustrating conventional distribution of material conveyed on one route of conveyor to two routes of material distribution paths. As illustrated in FIGS. 1(A)-(B), a material distribution rocker 12 may be provided between one route of conveyor 11 and two routes of material distribution paths 131, 132, in which one path 131 may be provided above another path 132. Uniform distribution of material 101 conveyed on the conveyor 11 to the two routes of material distribution paths 131, 132 is possibly achieved by automatic control of up-down switching of material distribution rocker 12.

Alternatively, referring to FIGS. 2(A)-(B), there are shown, respectively, a structural top view and a partly structural side view illustrating conventional distribution of material conveyed on three routes of conveyors to four routes of material distribution paths. As illustrated in these figures, when distribution procedure for material 101 is proceeded, the material 101 conveyed on a first conveyor 151 may be delivered to a first material distribution path 171 and a second material distribution path 172, respectively, through up-down switching of a material distribution rocker 16, the material 101 conveyed on a second conveyor 152 may be delivered to a third material distribution path 173 directly, while the material 101 conveyed on a third conveyor 153 may be delivered to a fourth route 174 directly.

Thus, the material 101 conveyed on one route of conveyor (such as the first conveyor 151, for example) may be shared by the first material distribution path 171 and the second material distribution path 172, while the material 101 conveyed on one route of conveyor (such as the second conveyor 152 or third conveyor 153) may be received by the third material distribution path 173 or fourth material distribution path 174 individually. Thus, in this way of material distribution, the amount of material 101 distributed to the first material distribution path 171 and the second material distribution path 172 may be then smaller than that distributed to the third material distribution path 173 or fourth material distribution path 174. For instance, the amount of material 101 distributed to the first route 171 or second route 172 is only half of that distributed to the third material distribution path 173 or fourth material distribution path 174.

In this case, non-uniform material distribution may occur if the conventional automatic material distribution is further applied to distribution of material from three routes of conveyors to four routes of material distribution paths, further affecting production efficiency in subsequent process or assembly with respect to material.

SUMMARY OF THE INVENTION

It is one object of the present invention to provide a material distribution system and material distribution method thereof, applied to distribution of material conveyed on three routes of conveyors to four routes of material distribution paths. Moreover, the object of uniform distribution or non-uniform distribution of material conveyed on the three routes of conveyors to the four routes of material distribution paths may be achieved by means of left-right material distribution facilitated by one movable material-distributing guide plate and up-down material distribution facilitated by two material distribution rockers.

It is one object of the present invention to provide a material distribution system and material distribution method thereof, in which each route of conveyor is provided with a pair of stopping and clamping devices, respectively. Timing and amount of delivery of material from each route of conveyor to two material distribution rockers may be determined by controlling operations of stopping, clamping and discharging material of each pair of stopping and clamping devices. Afterwards, uniform or non-uniform distribution of material received from each route of conveyor to four routes of material distribution paths may be then achieved for two material distribution rockers.

To achieve above objects, the present invention provides a material distribution system, comprising: a first material distribution rocker; a second material distribution rocker; three routes of conveyors, used for conveying material, respectively, comprising a first conveyor, a second conveyor and a third conveyor, the first conveyor being connected at one side thereof to a first stationary material-distributing guide plate provided toward the first material distribution rocker, the second conveyor being connected at one side thereof to a second movable material-distributing guide plate selectively switched toward the first material distribution rocker or second material distribution rocker, the third conveyor being connected at one side thereof to a third stationary material-distributing guide plate provided toward the second material distribution rocker; and four routes of material distribution paths, comprising a first material distribution path, a second material distribution path, a third material distribution path and a fourth material distribution path, the first material distribution path being provided above the second material distribution path, while the third material distribution path being provided above the fourth material distribution path; wherein the first material distribution rocker is used for receiving the material conveyed on the first conveyor or second conveyor through the first stationary material-distributing guide plate or second movable material-distributing guide plate, as well as the material conveyed on the first or second conveyor is delivered to the first or second material distribution path by selectively switching the first material distribution rocker toward the first or second material distribution path, while the second material distribution rocker is used for receiving the material conveyed on the second conveyor or third conveyor through the second movable material-distributing guide plate or third stationary material-distributing guide plate, as well as the material conveyed on the second or third conveyor is delivered to the third or fourth material distribution path by selectively switching the second material distribution rocker toward the third or fourth material distribution path.

In one embodiment of the present invention, wherein the first stationary material-distributing guide plate comprises a first stopper, the second movable material-distributing guide plate comprises a second stopper, and the third stationary material-distributing guide plate comprises a third stopper, the first stopper stopping or discharging the material conveyed on the first conveyor, the second stopping or discharging the material conveyed on the second conveyor, and the third stopper stopping or discharging the material conveyed on the third conveyor.

In one embodiment of the present invention, wherein when the second movable material-distributing guide plate is switched toward the first material distribution rocker, the first stopper of the first stationary material-distributing guide plate is operated in a material stopping state, alternatively, when the second movable material-distributing guide plate is switched toward the second material distribution rocker, the third stopper of the third stationary material-distributing guide plate is operated in a material stopping state.

In one embodiment of the present invention, wherein the first conveyor is provided at the other side thereof with a first clamping device, the second conveyor is provided at the other side thereof with a second clamping device, and the third conveyor is provided at the other side thereof with a third clamping device, the first clamping device being used together with the first stopper to stop and clamp the material conveyed on the first conveyor, the second clamping device being used together with the second stopper to stop and clamp the material conveyed on the second conveyor, and the third clamping device being used together with the third stopper to stop and clamp the material conveyed on the third conveyor.

In one embodiment of the present invention, wherein when the first stopper is operated to stop material for allowing the collection of material up to the location of the first clamping device, the first clamping device is operated to clamp material, when the second stopper is operated to stop material for allowing the collection of material up to the location of the second clamping device, the second clamping device is operated to clamp material, and when the third stopper is operated to stop material for allowing the collection of material up to the location of the third clamping device, the third clamping device is operated to clamp material, an amount of material stopped and clamped between the first stopper and the first clamping device being equal to that stopped and clamped between the second stopper and the second clamping device or that stopped and clamped between the third stopper and the third clamping device.

In one embodiment of the present invention, wherein when the second movable material-distributing guide plate is switched toward the first material distribution rocker, the first stopper is operated in a material stopping state, the second stopper is operated to discharge the material stopped and clamped on the second conveyor to the first material distribution rocker, and the third stopper is operated to discharge the material stopped and clamped on the third conveyor to the second material distribution rocker; alternatively, when the second movable material-distributing guide plate is switched toward the second material distribution rocker, the first stopper is operated to discharge the material stopped and clamped on the first conveyor to the first material distribution rocker, the second stopper is operated to discharge material stopped and clamped on the second conveyor to the second material distribution rocker, and the third stopper is operated in a material stopping state.

In one embodiment of the present invention, wherein the first material distribution rocker is connected at one side thereof to a first redirecting way and selectively switched at another side thereof toward the first material distribution path or the second material distribution path, the first material distribution rocker is used for receiving material conveyed on the first conveyor or the second conveyor through the first redirecting way, while the second material distribution rocker is connected at one side thereof to a second redirecting way and selectively switched at another side thereof toward the third material distribution path or the fourth material distribution path, the second material distribution rocker is used for receiving material conveyed on the second conveyor or the third conveyor through the second redirecting way.

In one embodiment of the present invention, wherein the first material distribution rocker is further provided at the other side thereof with a first stopping part, while the second material distribution rocker is further provided at the other side thereof with a second stopping part, stopping effect of the first stopping part or the second stopping part being started before switching motion of the first material distribution rocker or the second material distribution rocker is desirably proceeded, stopping effect of the first stopping part or the second stopping part being ended after switching motion of the first material distribution rocker or the second material distribution rocker is completed.

The present invention further provides a material distribution method of the material distribution system, the method being applied to delivery of material conveyed on the three routes of conveyors to the four routes of material distribution paths, comprising the steps of: stopping and clamping material conveyed on the first conveyor, the second conveyor and the third conveyor; performing a first material distribution procedure, comprising: selectively switching the second movable material-distributing guide plate toward the first material distribution rocker; discharging the material stopped and clamped on the second conveyor and the third conveyor to the first material distribution rocker and the second material distribution rocker, respectively; selectively switching the first material distribution rocker toward the first material distribution path or the second material distribution path, so as to achieve uniform distribution or non-uniform distribution of material conveyed on the second conveyor to the first material distribution path and the second material distribution path; selecting switching the second material distribution rocker toward the third material distribution path or the fourth material distribution path, so as to achieve uniform distribution or non-uniform distribution of material conveyed on the third conveyor to the third material distribution path and the fourth material distribution path; and after all the material stopped and clamped on the second conveyor and the third conveyor is discharged to the first material distribution rocker and the second material distribution rocker, respectively, the material conveyed on the second conveyor and the third conveyor is stopped and clamped again and a second material distribution procedure is performed subsequently; and performing the second material distribution procedure, comprising: selectively switching the second movable material-distributing guide plate toward the second material distribution rocker; discharging the material stopped and clamped on the first conveyor and the second conveyor to the first material distribution rocker and the second material distribution rocker, respectively; selectively switching the first material distribution rocker toward the first material distribution path or the second material distribution path, so as to achieve uniform distribution or non-uniform distribution of material conveyed on the first conveyor to the first material distribution path and the second material distribution path; selecting switching the second material distribution rocker toward the third material distribution path or the fourth material distribution path, so as to achieve uniform distribution or non-uniform distribution of material conveyed on the second conveyor to the third material distribution path and the fourth material distribution path; and after all the material stopped and clamped on the first conveyor and the second conveyor is discharged to the first material distribution rocker and the second material distribution rocker, respectively, the material conveyed on the first conveyor and the second conveyor is stopped and clamped again and the first material distribution procedure is performed again.

In one embodiment of the present invention, wherein when the second movable material-distributing guide plate is switched toward the first material distribution rocker, stopping material is proceeded for the material conveyed on the first conveyor, alternatively, when the second movable material-distributing guide plate is switched toward the second material distribution rocker, stopping material is proceeded for the material conveyed on the third conveyor.

DETAILED DESCRIPTION

Figure 1:
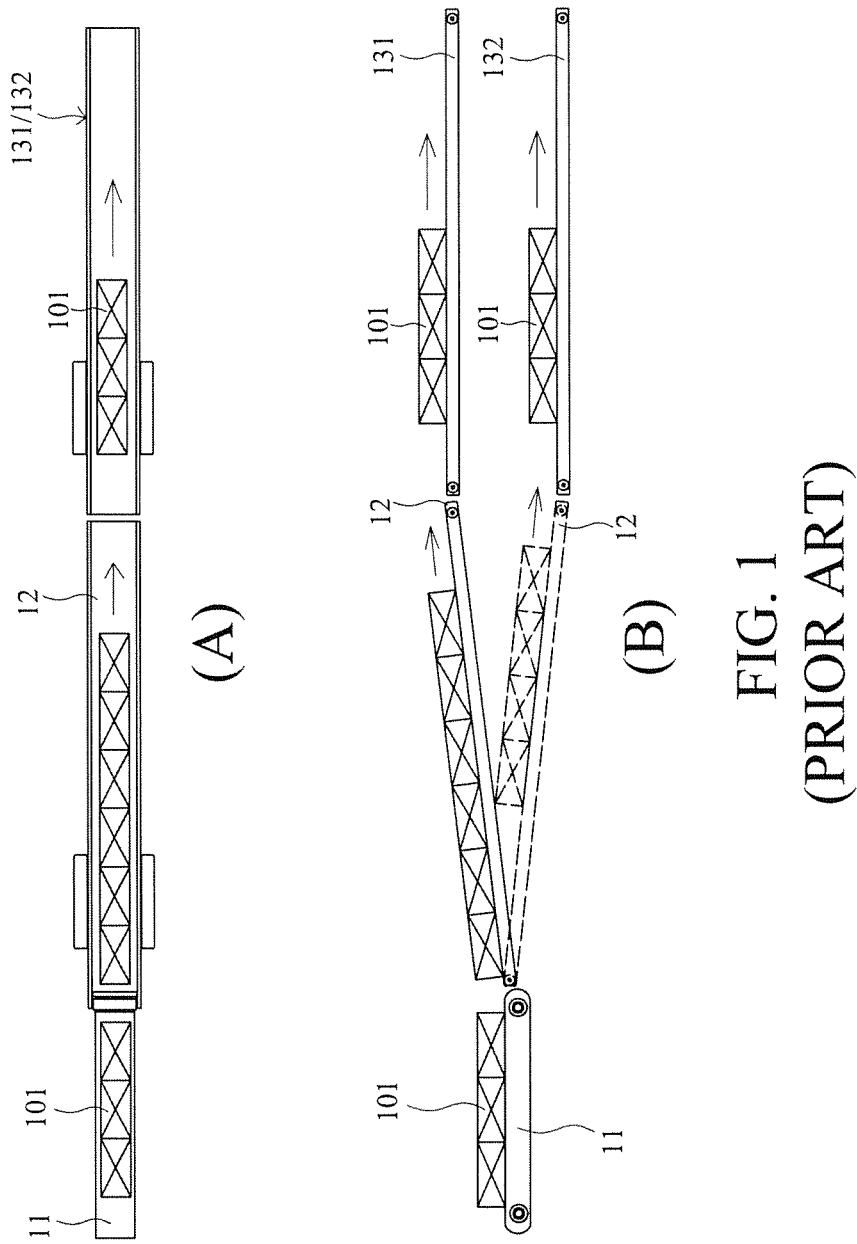
FIGS. 1(A)-(B) are a structural top view and a structural side view illustrating conventional distribution of material conveyed on one route of conveyor to two routes of material distribution paths.
Figure 2:
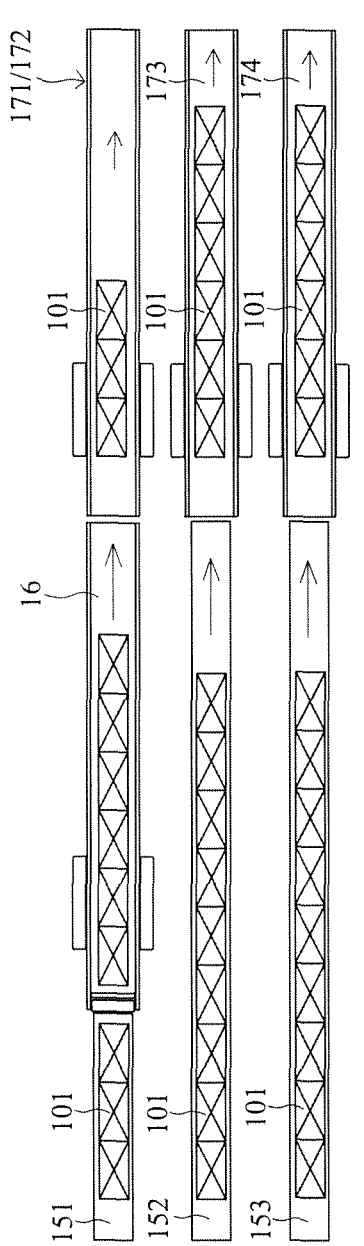
FIGS. 2(A)-(B) are a structural top view and a partly structural side view illustrating conventional distribution of material conveyed on three routes of conveyors to four routes of material distribution paths.
Figure 2:
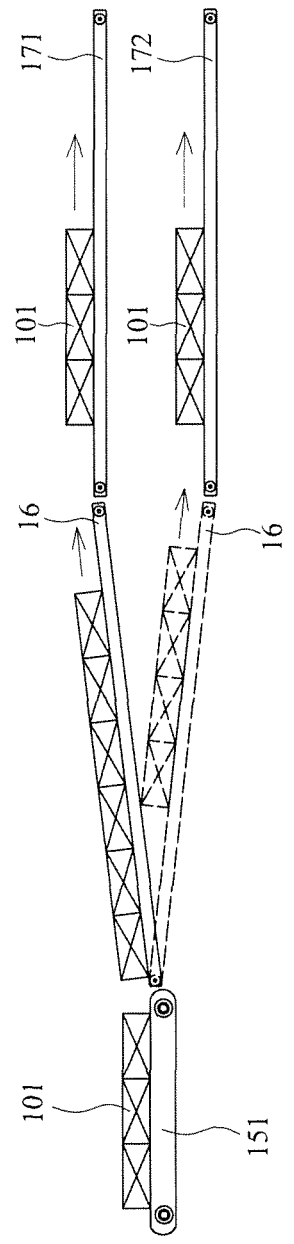

Referring to FIGS. 3(A)-3(B) and FIGS. 4(A)-(B), there are shown a structural top view and a structural side view of a material distribution process, as well as a structural top view and a structural side view of another material distribution process, respectively, of a material distribution system according to one preferred embodiment of the present invention. The material distribution system is allowed for the distribution of material conveyed on three routes of conveyors to four routes of material distribution paths. The material distribution system 300 of the present invention comprises three routes of conveyors 311, 312, 313, a first material distribution rocker 331, a second material distribution rocker 332 and four routes of material distribution paths 351, 352, 353, 354. Material 301 may be delivered to the four routes of material distribution paths 351, 352, 353, 354 by means of transportation on the three routes of conveyors 311, 312, 313, the first material distribution rocker 331 and the second material distribution rocker 332.

The three routes of conveyors 311, 312, 313, used for conveying material 301, respectively, comprise a first conveyor 311, a second conveyor 312 and a third conveyor 313. The first conveyor 311 is connected at one side thereof to a first stationary material-distributing guide plate 321 provided toward the first material distribution rocker 331, and the material 301 conveyed on the first conveyor 311 may be then delivered to the first material distribution rocker 331 through the first stationary material-distributing guide plate 321. The second conveyor 312 is connected at one side thereof to a second movable material-distributing guide plate 322 selectively switched toward the first material distribution rocker 331 or second material distribution rocker 332, and the material 301 conveyed on the second conveyor 312 may be delivered to the first material distribution rocker 331 or second material distribution rocker 332 through the second movable material-distributing guide plate 322. The third conveyor 313 is connected at one side thereof to a third stationary material-distributing guide plate 323 provided toward the second material distribution rocker 332, and the material 301 conveyed on the third conveyor 313 may be then delivered to the second material distribution rocker 332 through the third stationary material-distributing guide plate 323.

The four routes of material distribution paths 351, 352, 353, 354 comprise a first material distribution path 351, a second material distribution path 352, a third material distribution path 353 and a fourth material distribution path 354. In this case, the first material distribution path 351 is provided above the second material distribution path 352 while the third material distribution path 353 is provided above the fourth material distribution path 354.

The first material distribution rocker 331 is connected at one side thereof to a first redirecting way 3311. The first material distribution rocker 331 receives the material 301 conveyed on the first conveyor 311 or second conveyor 312 through the first redirecting way 3311. Furthermore, the other side of the first material distribution rocker 331 may be selectively upwardly switched toward the first material distribution path 351 or downwardly switched toward the second material distribution path 352, resulting in uniform distribution or non-uniform distribution of material 301 conveyed on the first conveyor 311 or second conveyor 312 to the first material distribution path 351 and the second material distribution path 352. The second material distribution rocker 332 is connected at one side thereof to a second redirecting way 3321. The second material distribution rocker 332 receives the material 301 conveyed on the second conveyor 312 or third conveyor 313 through the second redirecting way 3321. Furthermore, the other side of the second material distribution rocker 332 may be selectively upwardly switched toward the third material distribution path 353 or downwardly switched toward the fourth material distribution path 354, resulting in uniform distribution or non-uniform distribution of material 301 conveyed on the second conveyor 312 or third conveyor 313 to the third material distribution path 353 and the fourth material distribution path 354.

In this case, in the material distribution system 300 of the present invention, uniform distribution or non-uniform distribution of material 301 conveyed on the three routes of conveyors 311, 312, 313 to the four routes of material distribution paths 351, 352, 353, 354 may be achieved by means of left-right material distribution facilitated by one movable material-distributing guide plate 322 and up-down material distribution facilitated by two material distribution rockers 331, 332. Furthermore, the detailed material distribution process steps of the material distribution system 300 of the present invention will be further described later.

Further, the first stationary material-distributing guide plate 321 comprises a first stopper 3211, the second movable material-distributing guide plate 322 comprises a second stopper 3221 and the third stationary material-distributing guide plate 323 comprises a third stopper 3231. The first stopper 3211 is capable of stopping or discharging the material 301 conveyed on the first conveyor 311, the second stopper 3221 is capable of stopping or discharging the material 301 conveyed on the second conveyor 312, and the third stopper 3231 is capable of stopping or discharging the material 301 conveyed on the third conveyor 313.

Moreover, the first conveyor 311 is provided at the other side thereof with a first clamping device 3111, the second conveyor 312 is provided at the other side thereof with a second clamping device 3121, and the third conveyor 313 is provided at the other side thereof with a third clamping device 3131. The first clamping device 3111 is used together with the first stopper 3211 to stop and clamp the material 301 conveyed on the first conveyor 311, the second clamping device 3121 is used together with the second stopper 3221 to stop and clamp the material 301 conveyed on the second conveyor 312, and the third clamping device 3131 is used together with the third stopper 3231 to stop and clamp the material 301 conveyed on the third conveyor 313. When the first stopper 3211 is operated to stop material for allowing the collection of material 301 conveyed on the first conveyor 311 up to the location of first clamping device 3111, the first clamping device 3111 may be selectively operated to clamp material, in such a way that a certain amount of material 301 may be stopped and clamped between the first stopper 3211 and the first clamping device 3111. When the second stopper 3221 is operated to stop material for allowing the collection of material 301 conveyed on the second conveyor 312 up to the location of second clamping device 3121, the second clamping device 3121 may be selectively operated to clamp material, in such a way that a certain amount of material 301 may be stopped and clamped between the second stopper 3221 and the second clamping device 3121. When the third stopper 3231 is operated to stop material for allowing the collection of material 301 conveyed on the third conveyor 313 up to the location of third clamping device 3131, the third clamping device 3131 may be selectively operated to clamp material, in such a way that a certain amount of material 301 may be stopped and clamped between the third stopper 3231 and the third clamping device 3131. In one preferred embodiment of the present invention, the amount of material 301 stopped and clamped between the first stopper 3211 and the first clamping device 3111, that stopped and clamped between the second stopper 3221 and the second clamping device 3121, as well as that stopped and clamped between the third stopper 3231 and the third clamping device 3131 are equal.

Furthermore, in one embodiment of the present invention, when the second movable material-distributing guide plate 322 is selectively switched toward the first material distribution rocker 331, the first stopper 3211 is remained in a material stopping state. Correspondingly, when the second movable material-distributing guide plate 322 is selectively switched toward the second material distribution rocker 332, the third stopper 3231 is remained in a material stopping state. As stopping material is proceeded, simultaneous reception of material 301 conveyed on two routes of conveyors may be avoided for first material distribution rocker 331 or second material distribution rocker 332.

Further, in the present invention, the first material distribution rocker 331 is further provided at the other side thereof with a first stopping part 3313, while the second material distribution rocker 332 is further provided at the other side thereof with a second stopping part 3323. The first stopping part 3313 is started to stop the material 301 before the first material distribution rocker 331 is switched desirably, until the switching motion of the first material distribution rocker 331 is completed. Similarly, when the second stopping part 3323 is started to stop the material 301 before the second material distribution rocker 332 is switched desirably, until the switching motion of the second material distribution rocker 332 is completed. In this case, stopping effect of the first stopping part 3313 or second stopping part 3323 may be used to avoid the material 301 to be dropped out of the first material distribution rocker 331 or second material distribution rocker 332 at the time when the first material distribution rocker 331 or second material distribution rocker 332 is switched.

As such, the detailed material distribution process steps of the material distribution of material 301 conveyed on the three routes of conveyors 311, 312, 313 to the four routes of material distribution paths 351, 352, 353, 354 will be described as follows. In the initial material distribution state, the first stopper 3211, the second stopper 3221 and the third stopper 3231 are used for stopping the material 301 conveyed on the first conveyor 311, the second conveyor 312 and the third conveyor 313, respectively. When stopping material is achieved by the first stopper 3211, the second stopper 3221 and the third stopper 3231 allowing the collection of material 301 conveyed on the first conveyor 311, the second conveyor 312 and the third conveyor 313 up to the locations of the first clamping device 3111, the second clamping device 3121 and the third clamping device 3131, the first clamping device 3111, the second clamping device 3121 and the third clamping device 3131 may be operated to clamp material. Then, the amount of material 301 stopped and clamped between the first stopper 3211 and the first clamping device 3111, that stopped and clamped between the second stopper 3221 and the second clamping device 3121, as well as that stopped and clamped between the third stopper 3231 and the third clamping device 3131 are all equal.

Figure 3:
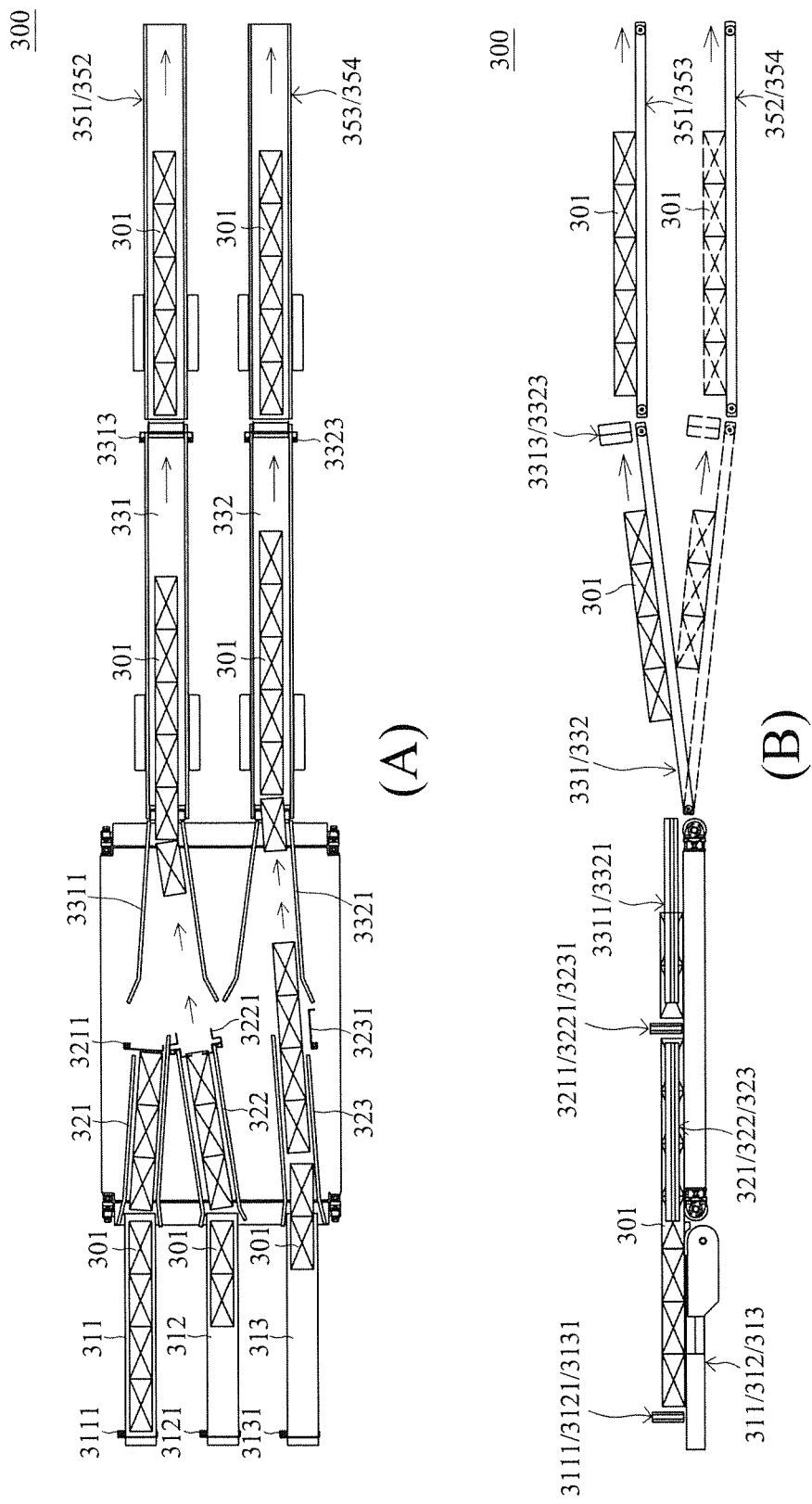
FIGS. 3(A)-(B) are a structural top view and a structural side view illustrating one material distribution process of a material distribution system according to one preferred embodiment of the present invention.

After equivalent amount of material 301 is stopped and clamped between the first stopper 3211 and the first clamping device 3111, that is stopped and clamped between the second stopper 3221 and the second clamping device 3121, as well as that is stopped and clamped between the third stopper 3231 and the third clamping device 3131, the first material distribution process illustrated in FIGS. 3(A)-(B) may be performed.

In the first material distribution process illustrated in FIGS. 3(A)-(B), the second movable material-distributing guide plate 322 is selectively switched toward the first material distribution rocker 331, as well as the second stopper 3221 and the third stopper 3231 may be operated to discharge material, so as to discharge the material 301 stopped and clamped on the second conveyor 312 and the third conveyor 313 to the first material distribution rocker 331 and the second material distribution rocker 332, respectively. In the meantime, the first stopper 3211 is remained in the material stopping state.

After the material 301 conveyed on the second conveyor 312 is received by the first material distribution rocker 331, the first material distribution rocker 331 may be selectively switched toward the first material distribution path 351 or second material distribution path 352, resulting in uniform distribution or non-uniform distribution of material 301 conveyed on the second conveyor 312 to the first material distribution path 351 and the second material distribution path 352. In the meantime, after the material 301 conveyed on the third conveyor 313 is additionally received by the second material distribution rocker 332, the second material distribution rocker 332 may be selectively switched toward the third material distribution path 353 or fourth material distribution path 354, resulting in uniform distribution or non-uniform distribution of material 301 conveyed on the third conveyor 313 to the third material distribution path 353 and the fourth material distribution path 354.

Afterwards, after all the material 301 stopped and clamped on the second conveyor 312 and the third conveyor 313 is discharged to the first material distribution rocker 331 and the second material distribution rocker 332, respectively, the second stopper 3221 together with the second clamping device 3121 and the third stopper 3231 together with the third clamping device 3131 may be operated again to stop and clamp the material 301 conveyed on the second conveyor 312 and the third conveyor 313, respectively. Moreover, the second material distribution procedure illustrated in FIGS. 4(A)-(B) is performed subsequently.

Figure 4:
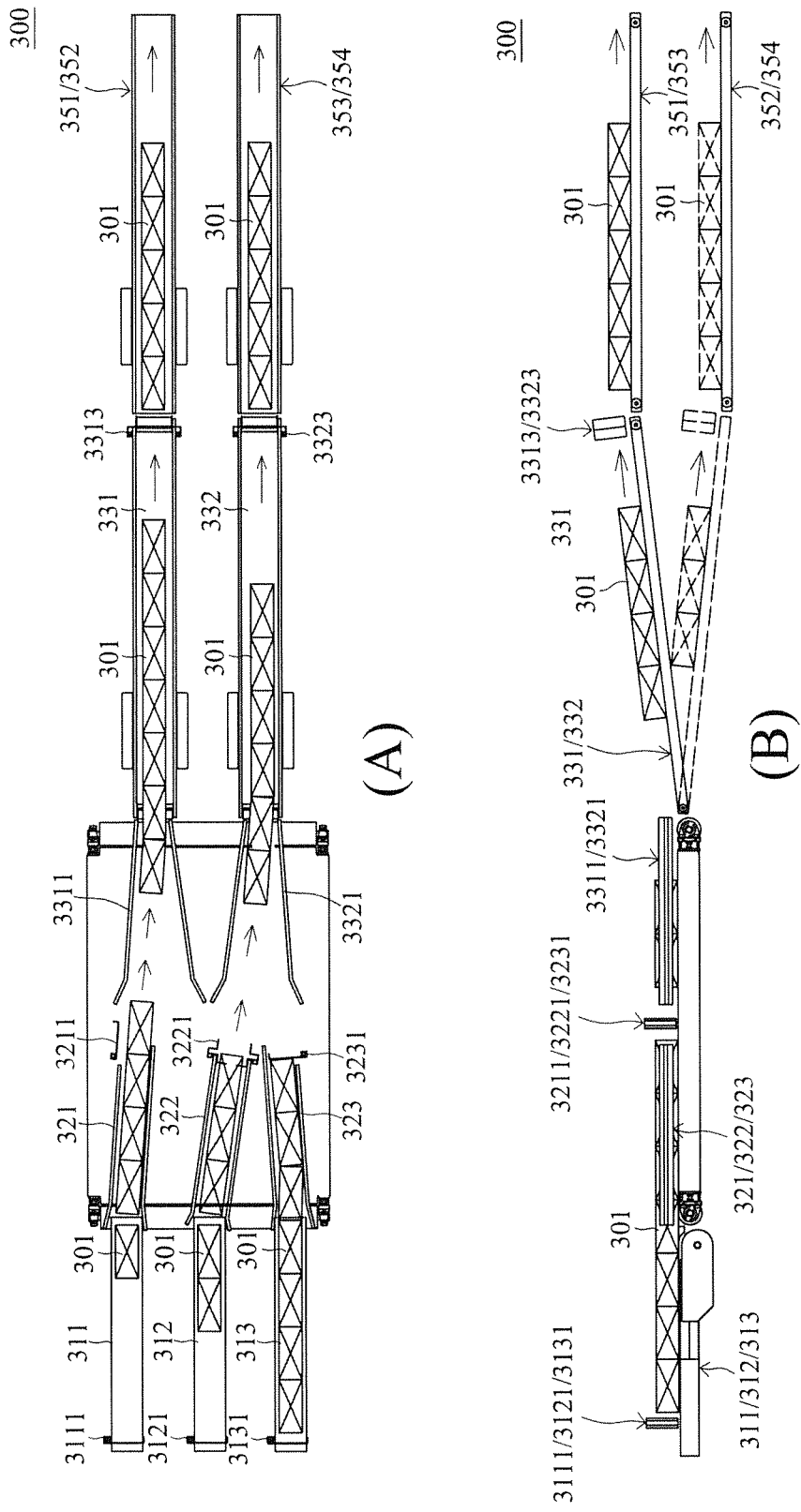
FIGS. 4(A)-(B) are a structural top view and a structural side view illustrating one material distribution process of a material distribution system according to another preferred embodiment of the present invention.

In the second material distribution process illustrated in FIGS. 4(A)-(B), the second movable material-distributing guide plate 322 is selectively switched toward the second material distribution rocker 332, as well as the first stopper 3211 and the second 3221 may be operated to discharge material, so as to discharge the material 301 stopped and clamped on the first conveyor 311 and the second conveyor 312 to the first material distribution rocker 331 and the second material distribution rocker 332, respectively. In the meantime, the third stopper 3231 is remained in the material stopping state.

After the material 301 conveyed on the first conveyor 311 is received by the first material distribution rocker 331, the first material distribution rocker 331 may be selectively switched toward the first route 351 or second route 352, resulting in uniform distribution or non-uniform distribution of material 301 conveyed on the first conveyor 311 to the first route 351 and the second route 352. In the meantime, after the material 301 conveyed on the second conveyor 312 is additionally received by the second material distribution rocker 332, the second material distribution rocker 332 may be selectively switched toward the third route 353 or fourth route 354, resulting in uniform distribution or non-uniform distribution of material 301 conveyed on the second conveyor 312 to the third route 353 and the fourth route 354.

Furthermore, after all the material 301 stopped and clamped on the first conveyor 311 and the second conveyor 312 is discharged to the first material distribution rocker 331 and the second material distribution rocker 332, respectively, the first stopper 3211 together with the first clamping device 3111 and the second stopper 3221 together with the second clamping device 3121 may be operated again to stop and clamp the material 301 conveyed on the first conveyor 311 and the second conveyor 312, respectively. Moreover, the first material distribution process illustrated in FIGS. 3(A)-(B) is performed again.

All the material 301 conveyed on the first conveyor 311 may be received by the first material distribution rocker 331 from the first stationary material-distributing guide plate 321, all the material 301 conveyed on the third conveyor 313 may be received by the second material distribution rocker 332 from the third stationary material-distributing guide plate 323, and the material 301 conveyed on the second conveyor 312 may be received by the first material distribution rocker 331 and the second material distribution rocker 332 in part, respectively, from the second movable material-distributing guide plate 322, by means of carrying out above process steps repeatedly. For instance, uniform distribution or non-uniform distribution of material 301 conveyed on the second conveyor 312 to the first material distribution rocker 331 and the second material distribution rocker 332 may be selected by the second movable material-distributing guide plate 322. Afterwards, uniform distribution or non-uniform distribution of all the material 301 conveyed on the first conveyor 311 and a part of material 301 conveyed on the second conveyor 312 to the first material distribution path 351 and the second material distribution path 352 may be then achieved by the first material distribution rocker 331, while uniform distribution or non-uniform distribution of all the material 301 conveyed on the third conveyor 313 and a part of material 301 conveyed on the second conveyor 312 to the third material distribution path 353 and the fourth material distribution path 354 may be then achieved by the second material distribution rocker 332. As such, the object of uniform distribution or non-uniform distribution of material 301 conveyed on the three routes of conveyors 311, 312, 313 to the four routes of material distribution paths 351, 352, 353, 354 of the present invention may be achieved.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

The invention claimed is:

1. A material distribution system, comprising:
   a first material distribution rocker;
   a second material distribution rocker;
   three routes of conveyors, used for conveying material, respectively, comprising a first conveyor, a second conveyor and a third conveyor, said first conveyor being connected at one side thereof to a first stationary material-distributing guide plate provided toward said first material distribution rocker, said second conveyor being connected at one side thereof to a second movable material-distributing guide plate selectively switched toward said first material distribution rocker or second material distribution rocker, said third conveyor being connected at one side thereof to a third stationary material-distributing guide plate provided toward said second material distribution rocker; and
   four routes of material distribution paths, comprising a first material distribution path, a second material distribution path, a third material distribution path and a fourth material distribution path, said first material distribution path being provided above said second material distribution path, while said third material distribution path being provided above said fourth material distribution path;
   wherein said first material distribution rocker is used for receiving the material conveyed on said first conveyor or second conveyor through said first stationary material-distributing guide plate or second movable material-distributing guide plate, as well as the material conveyed on said first or second conveyor is delivered to said first or second material distribution path by selectively switching said first material distribution rocker toward said first or second material distribution path, while said second material distribution rocker is used for receiving the material conveyed on said second conveyor or third conveyor through said second movable material-distributing guide plate or third stationary material-distributing guide plate, as well as the material conveyed on said second or third conveyor is delivered to said third or fourth material distribution path by selectively switching said second material distribution rocker toward said third or fourth material distribution path.

2. The material distribution system according to claim 1, wherein said first stationary material-distributing guide plate comprises a first stopper, said second movable material-distributing guide plate comprises a second stopper, and said third stationary material-distributing guide plate comprises a third stopper, said first stopper stopping or discharging the material conveyed on said first conveyor, said second stopping or discharging the material conveyed on said second conveyor, and said third stopper stopping or discharging the material conveyed on said third conveyor.

3. The material distribution system according to claim 2, wherein when said second movable material-distributing guide plate is switched toward said first material distribution rocker, said first stopper of said first stationary material-distributing guide plate is operated in a material stopping state, alternatively, when said second movable material-distributing guide plate is switched toward said second material distribution rocker, said third stopper of said third stationary material-distributing guide plate is operated in a material stopping state.

4. The material distribution system according to claim 2, wherein said first conveyor is provided at the other side thereof with a first clamping device, said second conveyor is provided at the other side thereof with a second clamping device, and said third conveyor is provided at the other side thereof with a third clamping device, said first clamping device being used together with said first stopper to stop and clamp the material conveyed on said first conveyor, said second clamping device being used together with said second stopper to stop and clamp the material conveyed on said second conveyor, and said third clamping device being used together with said third stopper to stop and clamp the material conveyed on said third conveyor.

5. The material distribution system according to claim 4, wherein when said first stopper is operated to stop material for allowing the collection of material up to the location of said first clamping device, said first clamping device is operated to clamp material, when said second stopper is operated to stop material for allowing the collection of material up to the location of said second clamping device, said second clamping device is operated to clamp material, and when said third stopper is operated to stop material for allowing the collection of material up to the location of said third clamping device, said third clamping device is operated to clamp material, an amount of material stopped and clamped between said first stopper and said first clamping device being equal to that stopped and clamped between said second stopper and said second clamping device or that stopped and clamped between said third stopper and said third clamping device.

6. The material distribution system according to claim 4, wherein when said second movable material-distributing guide plate is switched toward said first material distribution rocker, said first stopper is operated in a material stopping state, said second stopper is operated to discharge the material stopped and clamped on said second conveyor to said first material distribution rocker, and said third stopper is operated to discharge the material stopped and clamped on said third conveyor to said second material distribution rocker; alternatively, when said second movable material-distributing guide plate is switched toward said second material distribution rocker, said first stopper is operated to discharge the material stopped and clamped on said first conveyor to said first material distribution rocker, said second stopper is operated to discharge material stopped and clamped on said second conveyor to said second material distribution rocker, and said third stopper is operated in a material stopping state.

7. The material distribution system according to claim 1, wherein said first material distribution rocker is connected at one side thereof to a first redirecting way and selectively switched at another side thereof toward said first material distribution path or said second material distribution path, said first material distribution rocker is used for receiving material conveyed on said first conveyor or said second conveyor through said first redirecting way, while said second material distribution rocker is connected at one side thereof to a second redirecting way and selectively switched at another side thereof toward said third material distribution path or said fourth material distribution path, said second material distribution rocker is used for receiving material conveyed on said second conveyor or said third conveyor through said second redirecting way.

8. The material distribution system according to claim 7, wherein said first material distribution rocker is further provided at the other side thereof with a first stopping part, while said second material distribution rocker is further provided at the other side thereof with a second stopping part, stopping effect of said first stopping part or said second stopping part being started before switching motion of said first material distribution rocker or said second material distribution rocker is desirably proceeded, stopping effect of said first stopping part or said second stopping part being ended after switching motion of said first material distribution rocker or said second material distribution rocker is completed.

9. A material distribution method of the material distribution system according to claim 1, said method being applied to delivery of material conveyed on said three routes of conveyors to said four routes of material distribution paths, comprising the steps of:
stopping and clamping material conveyed on said first conveyor, said second conveyor and said third conveyor;
performing a first material distribution procedure, comprising:
selectively switching said second movable material-distributing guide plate toward said first material distribution rocker;
discharging the material stopped and clamped on said second conveyor and said third conveyor to said first material distribution rocker and said second material distribution rocker, respectively;
selectively switching said first material distribution rocker toward said first material distribution path or said second material distribution path, so as to achieve uniform distribution or non-uniform distribution of material conveyed on said second conveyor to said first material distribution path and said second material distribution path;
selecting switching said second material distribution rocker toward said third material distribution path or said fourth material distribution path, so as to achieve uniform distribution or non-uniform distribution of material conveyed on said third conveyor to said third material distribution path and said fourth material distribution path; and
after all the material stopped and clamped on said second conveyor and said third conveyor is discharged to said first material distribution rocker and said second material distribution rocker, respectively, the material conveyed on said second conveyor and said third conveyor is stopped and clamped again and a second material distribution procedure is performed subsequently; and performing said second material distribution procedure, comprising:
- selectively switching said second movable material-distributing guide plate toward said second material distribution rocker;
- discharging the material stopped and clamped on said first conveyor and said second conveyor to said first material distribution rocker and said second material distribution rocker, respectively;
- selectively switching said first material distribution rocker toward said first material distribution path or said second material distribution path, so as to achieve uniform distribution or non-uniform distribution of material conveyed on said first conveyor to said first material distribution path and said second material distribution path;
- selecting switching said second material distribution rocker toward said third material distribution path or said fourth material distribution path, so as to achieve uniform distribution or non-uniform distribution of material conveyed on said second conveyor to said third material distribution path and said fourth material distribution path; and
- after all the material stopped and clamped on said first conveyor and said second conveyor is discharged to said first material distribution rocker and said second material distribution rocker, respectively, the material conveyed on said first conveyor and said second conveyor is stopped and clamped again and said first material distribution procedure is performed again.

10. The material distribution method according to claim 9, wherein when said second movable material-distributing guide plate is switched toward said first material distribution rocker, stopping material is proceeded for the material conveyed on said first conveyor, alternatively, when said second movable material-distributing guide plate is switched toward said second material distribution rocker, stopping material is proceeded for the material conveyed on said third conveyor.

* * * * *